United States Patent [19]

Cohen

[11] Patent Number: 5,205,524

[45] Date of Patent: Apr. 27, 1993

[54] ADJUSTABLE BRACKET

[75] Inventor: Maurice Cohen, Miami, Fla.

[73] Assignee: Capitol Hardware Manufacturing Co., Inc., Chicago, Ill.

[21] Appl. No.: 836,106

[22] Filed: Feb. 14, 1992

Related U.S. Application Data

[63] Division of PCT/US89/03535 filed Aug. 17, 1989.

[51] Int. Cl.[5] ............................................. A47G 29/02
[52] U.S. Cl. ..................... 248/235; 211/90; 211/103; 211/175; 248/222.2
[58] Field of Search .............. 248/222.2, 222.1, 220.2, 248/227, 235, 240, 243, 345, 241; 211/103, 90, 175

[56] References Cited

U.S. PATENT DOCUMENTS

| | | |
|---|---|---|
| 1,447,519 | 3/1923 | Schade . |
| 1,802,245 | 4/1931 | Foretich ..................... 248/222.2 X |
| 3,561,714 | 2/1971 | Zurawski et al. ................... 248/243 |
| 4,191,438 | 3/1980 | Day ..................................... 312/306 |
| 4,634,010 | 1/1987 | Otema ................................ 211/90 X |
| 4,884,702 | 12/1989 | Rekow ......................... 248/222.2 X |
| 4,981,227 | 1/1991 | Ingram ................................ 211/204 |
| 5,048,698 | 9/1991 | Konrad .......................... 211/103 X |

FOREIGN PATENT DOCUMENTS

| | | |
|---|---|---|
| 46462 | 5/1982 | Taiwan . |
| 115634 | 5/1988 | Taiwan . |
| 234611 | 6/1925 | United Kingdom . |

Primary Examiner—Ramon O. Ramirez
Attorney, Agent, or Firm—Wallenstein, Wagner & Hattis, Ltd.

[57] ABSTRACT

A shelf or hanger mounting bracket which comprises an inner bracket body having one end provided with projections configured for locking engagement with vertically extending slits in a wall-mounted upright mounting rail and an ornamental outer sleeve comprising a locking system enabling the sleeve to be continuously adjustable over a range of positions so that it can be adjusted to lie flush with the mounting wall. The locking system employs a latching member pivotally mounted on the forward end of the inner bracket body having a locking end slantingly engaging the confronting interior wall surface of the sleeve so that forward retracting movement of the sleeve cannot occur as long as the locking end is held in contact with this sleeve surface. Slipping rearward movement towards the wall readily occurs. In the preferred form of the invention the latching member has a release end extending forwardly of the pivot and having sufficient weight that the locking end is continually forced into engagement with the sleeve inner surface. An aperture in the bottom of the sleeve permits insertion of a pencil or similar object to bear against the release end so as to raise it, thereby rotating the locking end out of engagement, permitting limited withdrawal of the sleeve so that the bracket assembly can be removed from the mounting rail.

13 Claims, 3 Drawing Sheets

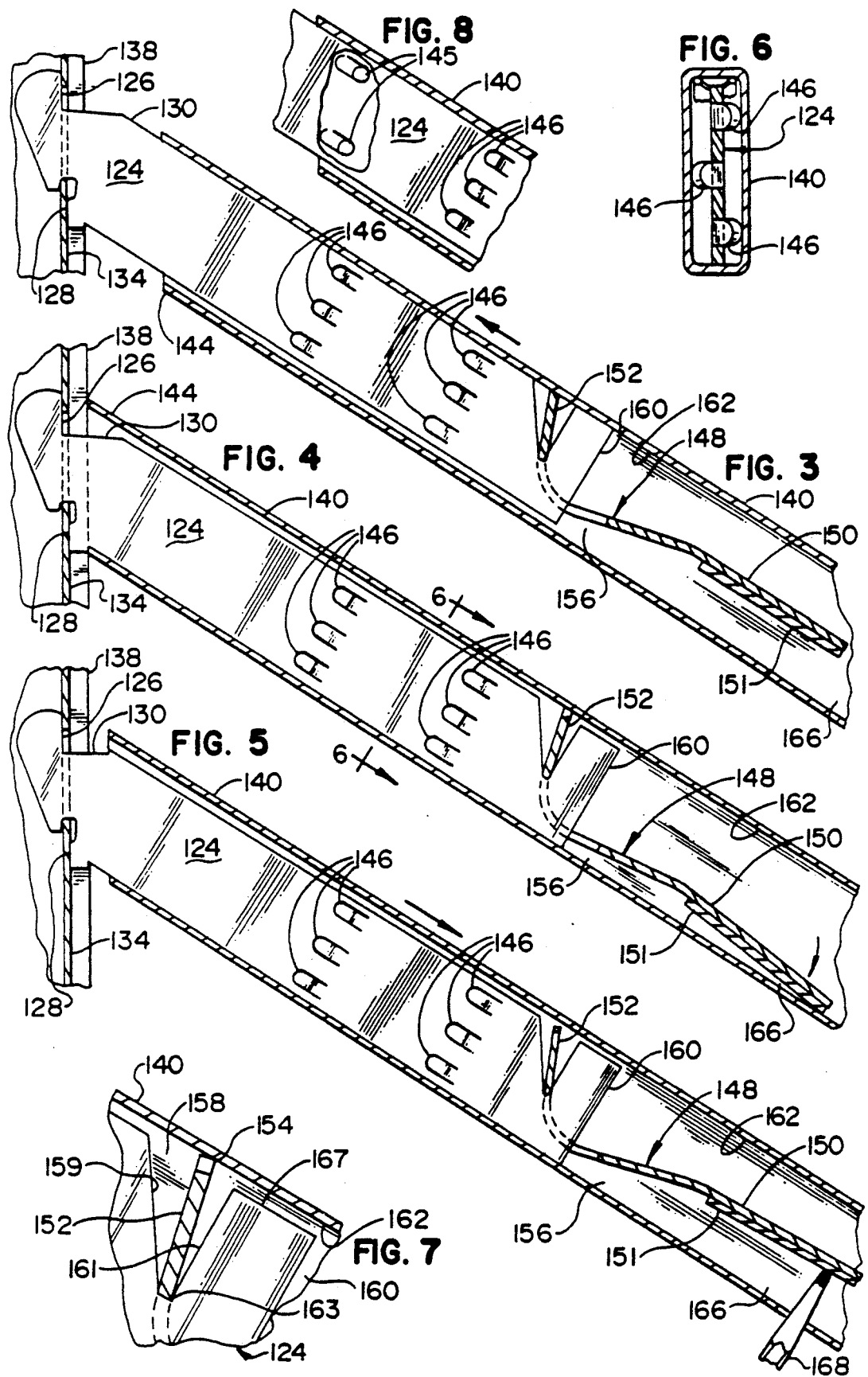

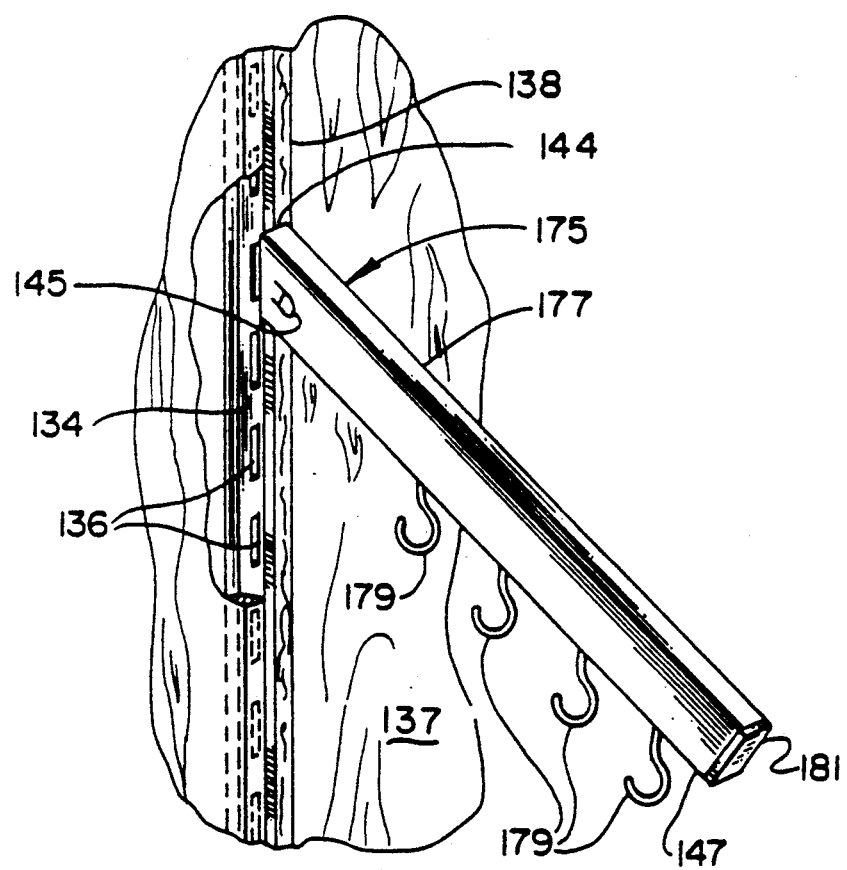

ADJUSTABLE BRACKET

RELATED APPLICATIONS

This application is a divisional of PCT Application Ser. No. US89/03535, filed Aug. 7, 1989.

DESCRIPTION

1. Technical Field

This invention relates to display hardware, in particular to brackets which can support shelving or garment supporting hangers from slotted uprights or rails.

2. Background of the Invention

Mounting systems for wall-mounted display hardware typically include horizontally spaced vertical uprights or rails generally mounted within vertical recesses in a mounting wall. Horizontally extending brackets having a pair of vertically spaced hooked extensions at the rear thereof are mounted within selected pairs of short vertically spaced outwardly facing slots formed in the outer faces of these uprights. The brackets are inserted into the upright slots by angling the hooked extension-carrying ends of the brackets in a downward direction at the time of insertion into the upright slots. The brackets are then pivoted downward and dropped onto the uprights to cause the hooked extensions to interlock with the upright slots.

If the brackets are designed to support shelving, they are provided at the front ends thereof with upwardly extending shelf engaging fingers to receive the forward ends of the shelving. These brackets are commonly plate-like brackets which are unattractive. To provide a more attractive bracket design, there has heretofore been developed a bracket design made in two pieces. One piece is an inner bracket body having an appearance very similar to that of the rear half of a conventional, thin, plate-like bracket, and thus includes a pair of vertically spaced hooked extensions at the rear end thereof. The inner bracket body is covered by an outer ornamental sleeve, also sometimes referred to as an outer tubular member, having a rear portion telescoping over the inner bracket body and a front portion projecting forwardly thereof. At the front end of this outer sleeve are shelf-receiving fingers if the bracket is to support shelving.

The rear edge or face of this outer ornamental sleeve is desirably configured to be flush with the outer surface of the mounting wall to eliminate any unsightly gaps between the outer ornamental sleeve and the mounting wall. However, when the outer sleeve has this flush relationship to the mounting wall, the bracket cannot be pivoted for insertion or removal of the bracket from the slotted uprights. It was therefore necessary to design the outer sleeve so that it is initially movable along the inner bracket body so it can be withdrawn from the rear end of the bracket body when the bracket body is inserted into or removed from the upright slots. After removal or re-insertion of the bracket inner body into the outer sleeve is pushed rearwardly where to bring it flush around the mounting wall surface. Some form of securing means, such as set screws or locking bolts, are then used to secure the sleeve against outward withdrawal of the sleeve.

While various locking systems have been provided to permit two telescoping members to be adjustable, one with respect to the other, and then locked in place in their adjustable positions, these locking systems have not been heretofore utilized in a bracket construction such as that described for a variety of reasons. In the first place, most of these locking systems do not permit a continuous progressive adjustment between the telescoping members, necessary to permit the outer sleeve in the bracket construction described to be mounted exactly flush with the mounting wall surface. A common locking system is one having an outwardly urged pin on the inner member which can be snapped into position in any one of a number of vertically spaced horizontal slots in the outer telescoping member. In the second place, these locking systems which did provide for a progressive continuous adjustment were generally too complicated and expensive for incorporation into the bracket constructions described, or required use of set screws or locking bolts to fix the position of the outer member. Set screws or locking bolts are not desirable because they take a special tool, namely a screw driver or Allen wrench, to lock the sleeve in place, and the need to tighten or release a screw or nut is an inconvenient means for releasing and locking the outer sleeve to the inner bracket body.

There has thus been a need for a simple, inexpensive and reliable means for locking and unlocking the outer sleeve from the inner bracket body in the bracket construction described, which did not require the use of a special tool to lock and unlock the outer sleeve from the inner bracket body, and which permitted a continuous progressive adjustment of the position of the outer sleeve over the inner bracket body.

SUMMARY OF THE INVENTION

According to a feature of the invention, a shelf or hanger mounting bracket preferably comprises an inner bracket body and an ornamental outer sleeve, sometimes referred to as an outer tubular member, with a unique means for enabling the sleeve to be continuously progressively adjustable over at least a limited range of positions, so that it can be telescopingly slid over the inner bracket body to an innermost position where the rear face of the outer sleeve lies flush with the mounting wall. To this end, the present invention provides a unique one-way releasable sliding latching member carried on the inner bracket body. The latching member can be an elongated member or bar which is pivotable on the inner bracket body. The latching member has a locking end edge portion inclined toward the inner surface of the sleeve and an opposite release end. The latching member is also preferably configured to be asymmetrically disposed about the pivot point of the member so that the weight of its release end portion will cause the locking edge portion of the latching member to be gravity-urged into contact with the interior surface of the sleeve. To this end, the release end of the latching member, which is on one side of the pivot point of the latching member, is much heavier than the locking end portion so that gravity will cause the release end of the locking member to be urged towards the upwardly facing surface of the bottom of the outer sleeve. An optional weight may be affixed to the release end to augment this action. The locking end portion contains an edge angled in a direction to make locking engagement with the closely facing inner surface of the sleeve, so that this locking edge prevents the outer sleeve from being moved forwardly away from its innermost position where it is flush against the outer surface of the mounting wall.

The sleeve has a hole in the bottom thereof which is located opposite the position of the heavier release end of the latching member. The hole is sized to receive a pencil or other similarly thin article which can be pushed upwardly to raise the release end of the latching member. This drops the locking end of the release member from engagement with the outer sleeve, permitting the outer sleeve to be moved forwardly away from the mounting wall surface so that the inner bracket body can be removed from, or replaced back into engagement with, the wall-mounted upright, involved.

The locking end of the latching member will engage the outer sleeve at an angle such that it will not arrest the sleeve from movement to a rearward direction after it is brought into flush engagement with the mounting wall surface. It is therefore not necessary to utilize a pencil to maintain the release end of the latching member in a raised position when it is desired to move the outer sleeve into its rearwardmost flush position with the mounting wall surface involved.

According to a related feature of the invention, the inner bracket body is configured as a single plate-shaped member having a V-shaped cutout at the forward end thereof. The remainder of the forward end of the inner bracket body thus forms an upwardly extending finger. The latching member is configured as a generally strap-shaped element having a slot therealong intermediate the locking and release ends thereof configured to engagingly receive the aforementioned finger. The latching member is thus pivotally mounted about the apex of the V-shaped slot. According to a further related feature of the invention, the inner bracket body is provided with outwardly extending protrusions on either major face thereof, the lengths of the protrusions being chosen so that they closely confront the major inner faces of the outer, tubular member to serve as alignment guides. Similarly placed protrusions may optionally be provided on the outer tubular member of the inner end thereof and disposed to arrestingly engage the protrusions on the inner body member to prevent accidental total withdrawal of the inner body member from the outer tubular member during handling. Similarly, the width of the generally strap-shaped latching member is preferably slightly less than the distance between the confronting major interior wall surfaces to provide a similar aligning effect of the latching member with respect to the inner body to insure that the latching member is freely pivotable thereon.

Thus, an inexpensive 3-piece assembly is provided which will allow the outer tubular member of a shelf bracket assembly to be easily and reliably retained in a flush position against the mounting surface, and which may easily be released for retraction to allow remounting without the use of special tools or fasteners.

There is known in the art a form of floor mountable upright display stand for hanging garments or the like, this stand having an upright outer tubular member affixed to a base and having an inner telescoping member which can be raised to various heights. A locking mechanism permitting a continuously adjustable range of heights is provided in the form of a latching member held loosely captive at the lower end of the inner member, which is urged by its own weight against lower support shoulders so as to be completely disengaged from the inner wall surfaces of the outer tubular member. If, however, the inner member is accelerated downward, then under the influence of inertial forces the latching member will rise into engagement with an upper supporting shoulder configured to rotatingly urge the ends of the latching member into arresting engagement with the aforementioned interior wall surfaces. The inner member is thus locked at a chosen height. Release is secured simply by moving the inner member upwards, at which time the latching member drops back to its lower position, disengaging from the inner wall surfaces. It will be appreciated that such a system uses inertial effects arising from acceleration to secure the locking condition, whereas the locking system of the present invention requires no such acceleration, the latching member being engaged with the outer sleeve at all times during rearward motion of the outer tubular member.

Other features and advantages of the invention will become apparent upon making reference to the specification, claims and drawings to follow.

DESCRIPTION OF THE DRAWINGS

FIGS. 3-5 are partly cut-away side views of one of the elements shown in FIG. 1 during insertion, when locked, and during removal thereof respectively.

FIG. 6 is a cross sectional view of an assembled support assembly.

FIG. 7 is a partially cut-away detail view of the assembly showing a locking mechanism for securing the support assembly together.

FIG. 8 is a partially cut-away view of one end of the bracket assembly.

FIG. 9 is a perspective view of a hanger support bracket assembly.

DESCRIPTION OF THE INVENTION

Figure 1:
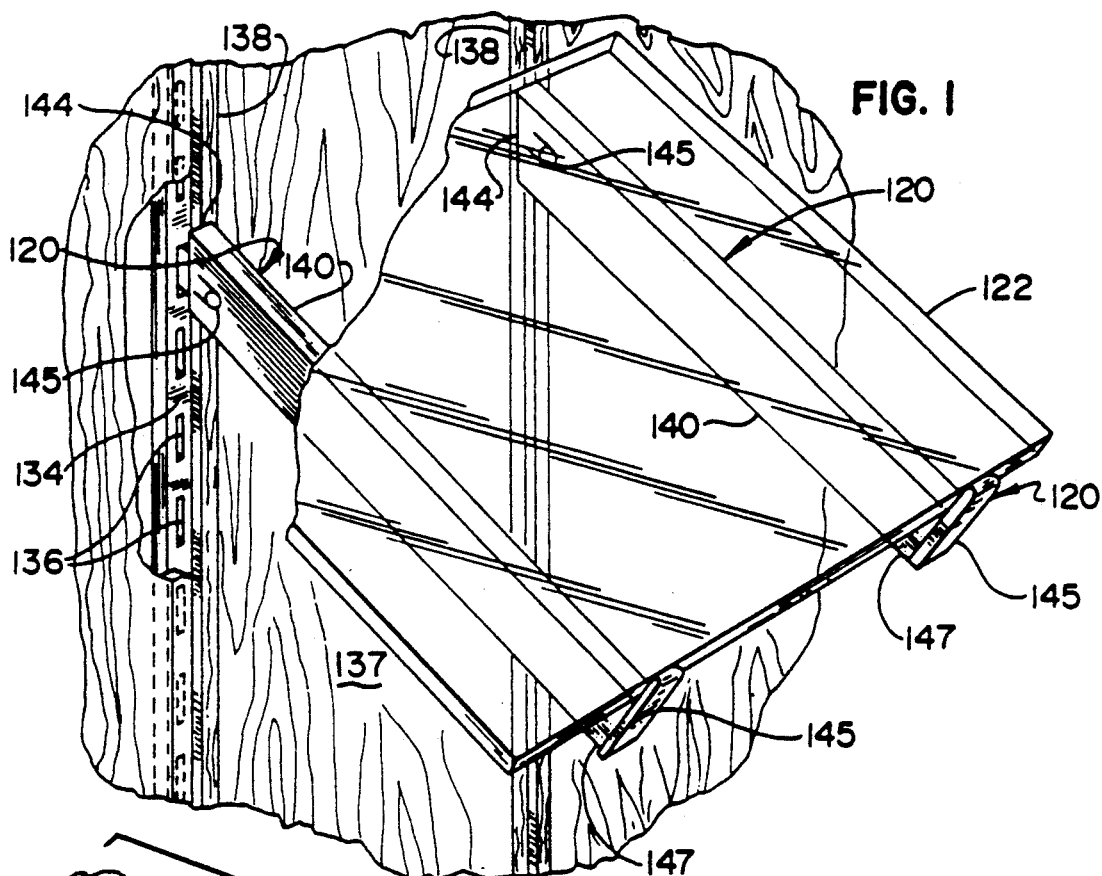
FIG. 1 is a perspective view of a shelf support bracket assembly for supporting a shelf.

FIG. 1 shows an inexpensive shelf support assembly bracket 120 for supporting a shelf 122. A pair of such assemblies 120 are shown in FIG. 1. The support bracket assemblies 120 shown in FIG. 1 are configured for downwardly sloping orientation; however, they may equally well be configured as horizontally disposed shelf support assemblies.

Figure 2:
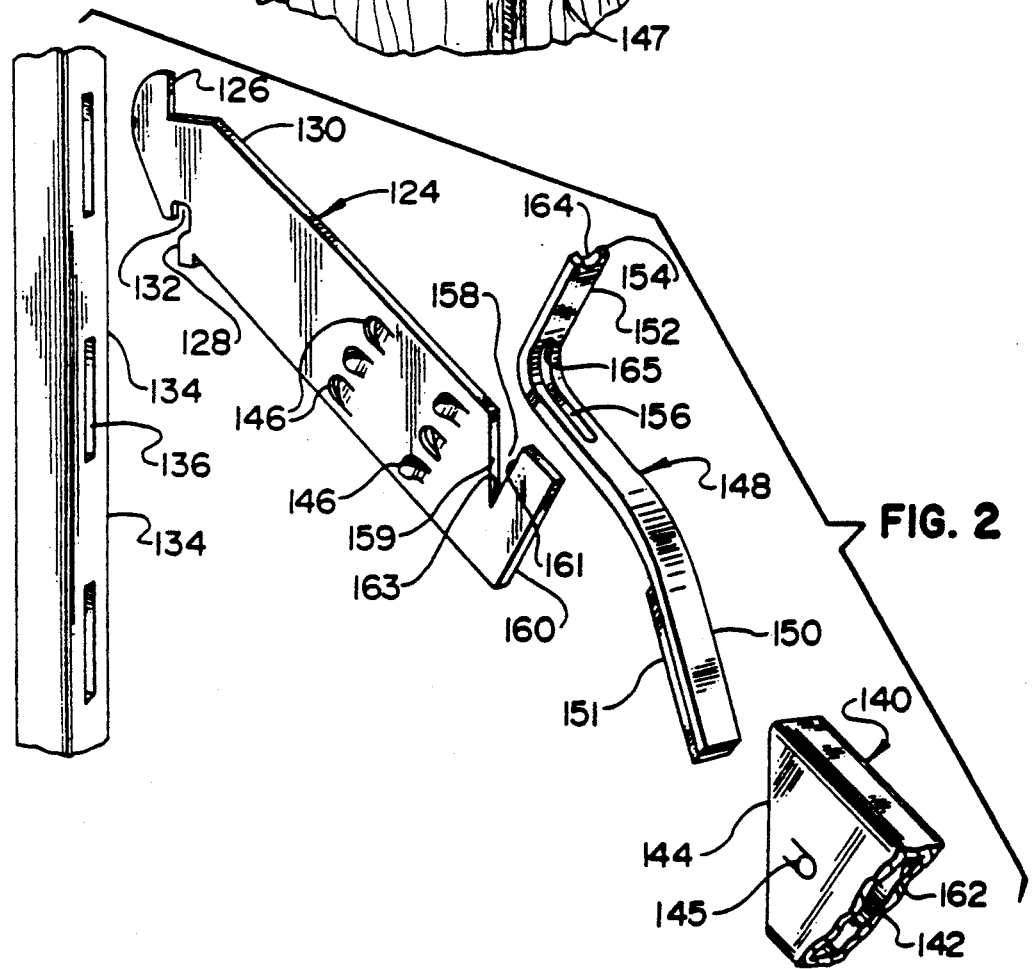
FIG. 2 is a perspective exploded view of one of the shelf support elements shown in FIG. 1.

Referring particularly to FIG. 2, each support assembly 120 includes a generally planar strap-shaped bracket inner body 124 having upper and lower shoulders 126 with an inner or locking end 130 thereon, and further having transversely extending notch 132 adjacent the lower shoulder 128. The shoulders 126, 128 and the notch 132 are configured for inserting locking engagement into a mounting rail 134 having slots 136 therein, the mounting rail, 134 being adapted to mounting to a wall 137 and having preferably an ornamental molding 138 disposed on either side thereof.

An ornamental tubular outer member 140 configured as a sleeve having a generally rectangular central passage 142 extending axially therealong is configured in the embodiment shown with an inner sleeve end 144 configured for flush engagement with the wall 137, or alternatively the molding 138 when the sleeve is slid fully over the inner body 124. Centering is preferably accomplished by means of centering tabs 146 extending outwardly from the major faces of the inner body 134. End caps 145 (FIG. 1) are provided at the outer ends 147 of the sleeve 140 to prevent the shelf 122 from sliding off the support assemblies 120. The sleeve 140 is automatically secured against withdrawal by a specially configured latching member 148 configured preferably from bent planar stock and having an extended portion forming a release end 150 (preferably augmented by an attached strap-shaped weight 151) and a sharply angled portion at the other end thereof forming a locking end 152 having a blade edge 154 at the end thereof. Intermediate the locking end 152 and the release end 150 there is a slot 156 provided running lengthwise along the arcuate region joining the locking end 152 and the release end 150. A V-shaped slot 158 is provided proximate to the outer end 160 of the inner body 124 by a forwardly angled slot face 159, joining and confronting perpendicular slot face 161 at a slot lengthwise extending wall face 163. The space between the outer end 160 and the slot 158 is thus configured as a finger 167 extending into the slot 156. As shown in FIGS. 3-5 the latching member 148 is thus pivotally secured to the outer end 160 of the inner body 124 when emplaced thereon by the engagement of the slot end face 165 of the latching member 148 with the joining wall portion 163. In particular it will be noted in FIGS. 3-5 that the length of the locking end 152 is chosen so that when engaged with the upper interior wall surface 162 of the sleeve 140 it is disposed at an angle thereto. Thus, as shown in FIG. 3, the sleeve may readily slide past the blade edge 154 as it is moved toward the locking end 130 of the inner body 124 during assembly. Final engagement flush with the molding 138 is shown in FIG. 4. To assist in alighment, the width of the latching member 148 is preferably slightly less than the interior wall separations of the sleeve 140.

If one next attempts to withdraw the sleeve 140, it will be seen that the blade edge 154 will be pivotally driven into hard engagement with the interior wall surface 164, preventing such withdrawal. In the preferred form of the invention this effect is augmented by reducing the effective length of the blade edge 154 by providing an arcuate cut-out 164 therein to shorten the effective bearing surface of the blade edge.

A tool passage 166 is provided in a lower portion of the sleeve 140 to allow insertion of a tool such as a pencil 168 to urge the release end 150 upward to withdraw the blade edge 154 from contact, thus allowing the sleeve to be withdrawn (FIG. 5). Only a slight retraction of the sleeve 140 is necessary to provide sufficient clearance between the sleeve end 144 and the molding 138 to allow the assembly 140 to be rotated to disengage the inner body 124 from the mounting rail 134.

Spring biasing means may equally well be employed to urge the blade edge 154 into similar engagement with the sleeve wall 162; however, this adds to the number of parts in the assembly. Optional inwardly extending tabs 145 may be provided extending from the major inner faces of the sleeve 140 to confrontingly arrestingly engage the centering tabs 146 to prevent accidental total withdrawal of inner body 124 from the sleeve 140 during handling of the assembly. FIG. 9 shows a modified assembly 175 adapted for hanging garments on display, the modified sleeve 177 having a number of hooks 179 downwardly depending therefrom. The end cap 181 does not have the projecting edge of the previous embodiment, since shelf retention is not necessary. All other part numbers have been kept the same in the previous embodiment because their functions are identical.

Thus, a simple inexpensive assembly has been provided which will allow the sleeve to be locked in close flush engagement with the mounting surface without employing such customary alternatives as sliding ratchets, extra securing screws or similar fastening methods well known in the art.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. A bracket comprising an inner bracket body having an inner end configured for interlocking engagement with vertical upright means providing a vertical mounting surface, an outer tubular member having front and rear ends and having an inner wall surface forming a sleeve telescoping over said inner bracket body, said outer tubular member being continuously progressively moveable along said inner bracket body over a range of positions unless locked against such movement, the rear end of said tubular member being shaped to be moved flush against said mounting surface when pushed fully rearwardly toward the inner end of said inner bracket body, and locking means for locking said tubular member against forward movement on said bracket member, the improvement comprising:

said locking means including a latching member having a locking end configured for locking engagement with said inner wall surface of said tubular member;

pivot-forming means on said inner bracket body for supporting said latching member for pivotal movement thereon, wherein said locking portion is normally urged into locking engagement with the inner wall surface of said tubular member, said locking end of said latching member being configured to engage said inner wall surface at an angle thereto, wherein movement of said outer tubular member rearwardly toward the inner end of said inner bracket body causes said locking end to freely slide over said inner wall surface, so that the rear end of said tubular member can be brought flush against said mounting surface, said angle of said locking end of said latching member causing said locking end to lock against said inner wall surface of said tubular member to prevent forward movement of said tubular member over a continuous range of positions of said tubular member unless released therefrom; and manually operable release means for at least momentarily releasing said locking end of said latching member from engagement with said outer tubular member, to permit the outer tubular member to be moved forwardly upon said inner bracket body.

2. The bracket of claim 1 wherein said release means includes an opening in said outer tubular member, said opening being sized and positioned to receive an end of a pencil and located to be opposite an end portion of said latching member when mounted on said inner bracket body, so that pressure from said pencil will pivot said latching member to bring said locking end thereof out of engagement with said interior wall surface, and permits at least a limited movement of said tubular member forwardly upon said inner bracket body so that the inner bracket body may be vertically pivoted or otherwise moved to permit it to be engaged or disengaged from said vertical upright means.

3. The bracket of claim 1 wherein said latching member is mounted on said pivot-forming means so that it can pivot in an up and down direction and gravity urges said, locking end of said latching member into engagement with said inner surface.

4. The bracket of claim 2 wherein said latching member is pivotally mounted between the ends thereof, the end of the latching member opposite said locking end being a release end positioned opposite said opening and said tubular member.

5. The bracket of claim 4 wherein said release end of the latching member is substantially heavier than the locking end of the latching member on the opposite side of said pivot point, so that the force of gravity will pull the release end of the latching member downwardly, and cause the locking end of said locking member to be urged upwardly into a locking engagement with the inner surface of said outer tubular member when a force is applied to the tubular member tending to move it in a forward direction.

6. The bracket of claim 1 wherein said locking end of said latching member has a thin edge which frictionally engages with the inner surface of said outer tubular member at an angle which locks the outer tubular member against such forward movement.

7. The bracket of claims 1 or 4 wherein said inner bracket body is a horizontally thin plate-like member.

8. The bracket of claim 7 wherein said latching member pivots in an up and down direction, the width of the interior of said outer tubular member is substantially greater than the width of said inner bracket body, and said inner bracket body has outward projections which engage the inner surfaces of said outer tubular member to guide the tubular member for sliding movement along said inner bracket body.

9. The bracket of claim 7 wherein said latching member is a vertically thin member.

10. The bracket of claim 9 wherein said latching member pivots up and down upon said inner bracket body and has a heavier release end portion opposite a pencil-receiving opening in said outer tubular member, so that insertion of a pencil or the like thereinto can engagingly pivot said latching member to move said locking end away from said inner surface, said heavier release end being on one side of said pivot point and said locking end being on the opposite side thereof.

11. The bracket of claim 9 wherein said release end curves down toward the bottom of said outer tubular member, said locking end of said latching member angling upwardly to make locking engagement with the downwardly facing inner surface of said outer tubular member, when the outer tubular member is forced in a forward direction.

12. The bracket of claim 9 wherein there is a vertically extending finger at the forward end of said inner bracket body, said finger being spaced from the rest of the inner bracket body to define the forward margin of a V-shaped vertical slot formed in the upper edge of said body, and said latching member having a slot through which said finger projects, said V-shaped slot on said inner bracket body enabling the latching member to pivot over the inner bracket body at a corner of said V-shaped slot in front of said finger.

13. The bracket of claim 5 including a supplemental weight affixed to said release end of said latching member.

* * * * *

UNITED STATES PATENT AND TRADEMARK OFFICE
CERTIFICATE OF CORRECTION

PATENT NO. : 5,205,524
DATED : April 27, 1993
INVENTOR(S) : Maurice Cohen

It is certified that error appears in the above-identified patent and that said Letters Patent is hereby corrected as shown below:

In Column 1, line 6, replace "7" by --17-- and after "1989" insert --and a continuation-in-part of U.S. Application Serial No. 183,608, filed April 19, 1988--.

In Column 4, line 47, after "126" insert --, 128--.

Signed and Sealed this

Thirtieth Day of May, 1995

Attest:

BRUCE LEHMAN

Attesting Officer

Commissioner of Patents and Trademarks